June 29, 1954 J. F. BENGTSSON 2,682,252
WEIGHING SCALE INDICATOR DEVICE
Filed July 24, 1952
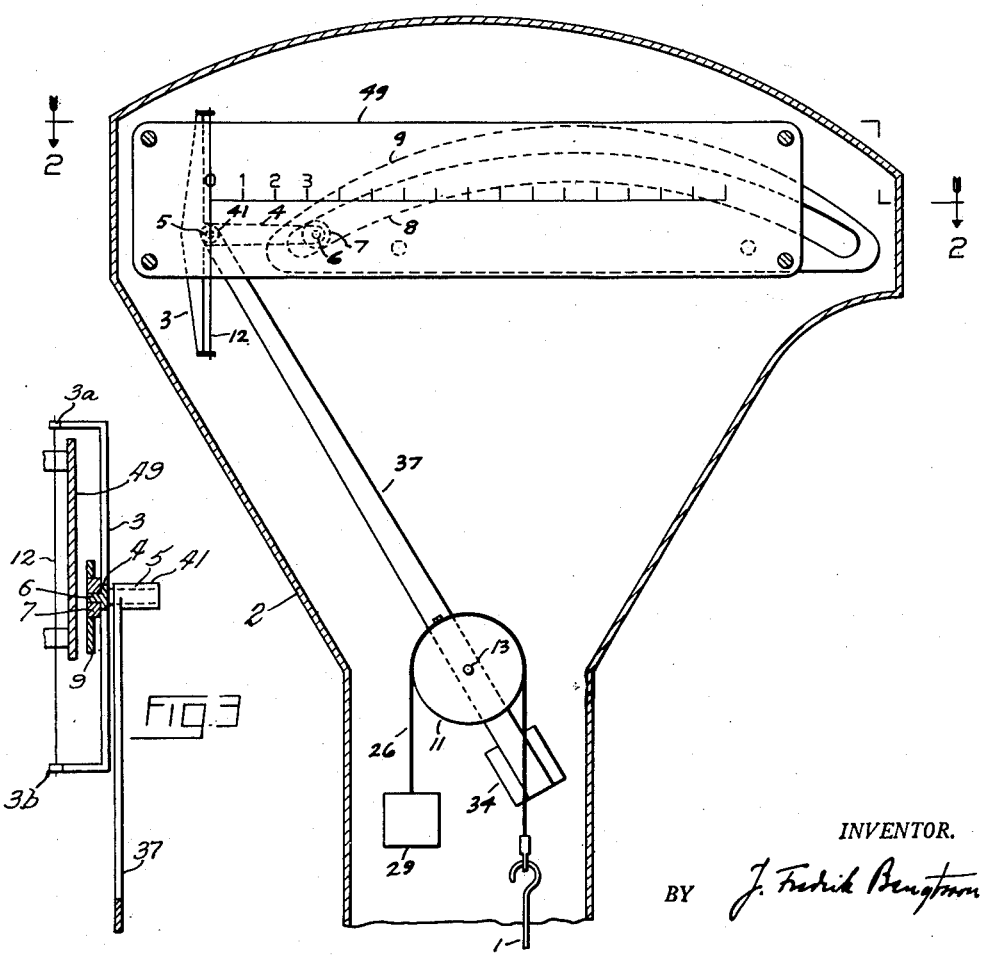
INVENTOR.
BY J. Fredrik Bengtsson Patented June 29, 1954

2,682,252

UNITED STATES PATENT OFFICE 2,682,252

WEIGHING SCALE INDICATOR DEVICE

Johan Fredrik Bengtsson, New York, N. Y.

Application July 24, 1952, Serial No. 300,738

1 Claim. (Cl. 116—129)

My invention relates to pendulum weighing scales of a kind described in my application Serial No. 768,009, filed August 11, 1947, now Patent No. 2,610,845, issued September 16, 1952, and more particularly to the indicator device thereof.

The object of the invention is to produce a simple and practical indicator device, primarily by eliminating the oblong dash pot, containing oil, described in the aforesaid prior application. This is accomplished as hereinafter described, reference being had to the drawing, wherein:

Fig. 1 is a section through the scale housing on the line 1—1, Fig. 2, with a front view of the device;

Fig. 2 is a section through the scale housing on the line 2—2, Fig. 1, with a plan view of the device.

Fig. 3 is an enlarged section on the line 3—3, Fig. 1, with a side view of the indicator carrier.

Similar numerals refer to similar parts throughout the views.

The load-counterbalancing pendulum, which comprises a power cylinder 11, a pendulum weight 34 and a pendulum arm 37, is rotatable about the shaft 13. The pendulum, the flexible ribbon 26, the weight 29, the link 1 connecting the pendulum with the scale platform (not shown), and the fixed, rectangular chart 49 are essentially as described in the aforesaid prior patent.

Disposed behind the chart 49, a T-formed indicator carrier, comprising a vertical arm 3, a horizontal arm 4 and a stud 5, is by means of the stud 5 mounted in the bearing 41 provided at the free end of the pendulum arm 37, so as to be rotatable in a plane parallel with the plane of oscillation of the pendulum. The free end of the horizontal arm 4 is provided with a lateral stud 6, on which is located a roller 7. To the back of the chart 49, which is visible through the transparent face 10 of the scale housing 2, is fixed a plate 9 having a pair of curved guide surfaces 8 and 8a defining a path between which said roller 7 travels, when the indicator carrier is being moved by the pendulum when a load is placed on the scale platform. To the forwardly bent ends 3a and 3b of the arm 3 is for indicating purposes affixed a cord 12, hereinafter called the indicator so that it extends vertically over the chart 49. The indicator carrier, with all parts attached to it, is so balanced that it has a tendency to turn clockwise on the stud 5, so that the roller 7 rests on the guide surface 8 with a slight pressure, so as to secure a definite vertical position of the indicator 12 when the scale mechanism is in equilibrium.

A load placed on the platform will cause the load-counterbalancing pendulum 11, 34, 37 to rotate about the shaft 13 to assume a new position of equilibrium. The indicator carrier 3, 4, being pivotally attached to the pendulum at 5, is thereby being moved. During the movement, the pivot 5 describes an arcuate path, and the roller 7 follows the arcuate guide surfaces 8 and 8a, so as to keep the indicator 12 in a vertical position. In the position of equilibrium, the indicator 12 indicates on the chart 49 the weight of the load. The vertical movement the indicator receives, due to the arcuate path of travel of the pivot 5, is not visible through the transparent face 10 and is of no consequence.

Having described my invention, I claim:

In a weighing scale, a chart, a pendulum arm movable in an arcuate path, an indicator carrier comprising a vertical arm and a horizontal arm pivotally mounted at the free end of said pendulum arm and movable transversely over said chart, an indicator vertically attached to said indicator carrier and coordinating with said chart, a pivot roller carried by said horizontal arm of the indicator carrier, a pair of curved, fixed guide surfaces defining a path between which said roller travels for maintaining said indicator definitely vertical during traverse of said chart.

References Cited in the file of this patent

UNITED STATES PATENTS

| Number | Name | Date |
|---|---|---|
| 204,086 | Rae | May 21, 1878 |
| 1,063,281 | Motherwell | June 3, 1913 |
| 2,463,882 | Kent | Mar. 8, 1949 |
| 2,534,569 | Bowditch | Dec. 19, 1950 |
| 2,610,845 | Bengtsson | Sept. 16, 1952 |

FOREIGN PATENTS

| Number | Country | Date |
|---|---|---|
| 288,262 | Italy | Sept. 2, 1931 |
| 367,474 | France | Sept. 3, 1906 |